United States Patent [19]

Gnann

[11] Patent Number: 4,831,907
[45] Date of Patent: May 23, 1989

[54] METHOD AND APPARATUS FOR CHECKING PERFORMANCE OF A CUTTING-OFF OPERATION

[75] Inventor: Alfred Gnann, Plochingen, Fed. Rep. of Germany

[73] Assignee: Index-Werke Komm.-Ges. Hahn & Tessky, Fed. Rep. of Germany

[21] Appl. No.: 54,651

[22] Filed: May 26, 1987

[30] Foreign Application Priority Data

May 31, 1986 [DE] Fed. Rep. of Germany ....... 3618349

[51] Int. Cl.$^4$ .......................... B23B 05/14; B23B 1/00
[52] U.S. Cl. ............................................. 82/47; 82/48
[58] Field of Search ..................... 82/1 C, 2 B, 47, 48, 82/101, 102

[56] References Cited

U.S. PATENT DOCUMENTS

| 2,377,384 | 6/1945 | Slovak | 82/47 |
| 2,656,588 | 10/1953 | Ovshinsky | 82/47 |
| 4,484,499 | 11/1984 | Lampietti | 82/48 |

FOREIGN PATENT DOCUMENTS

| 2520105 | 7/1983 | France | 82/2 B |
| 770663 | 10/1980 | U.S.S.R. | 82/2 B |
| 931308 | 5/1982 | U.S.S.R. | 82/2 B |
| 332307 | 7/1930 | United Kingdom | 82/48 |

Primary Examiner—James G. Smith
Assistant Examiner—William E. Terrell
Attorney, Agent, or Firm—Kramer, Brufsky & Cifelli

[57] ABSTRACT

The invention relates to a method for checking performance of the cutting-off operation on automatic lathes for working bar material or the like. In accordance with the invention, operating conditions are initiated at the end of a prescribed time interval for the cutting-off operation which result in relative rotation of the spindles in opposite directions in the event that the material has been completely severed at the cutting-off point. A discrepancy between the specified and the actual relative rotation is interpreted as a system failure due to the presence of a material link at the cutting-off point, whereupon a corresponding error signal is triggered.

9 Claims, 1 Drawing Sheet

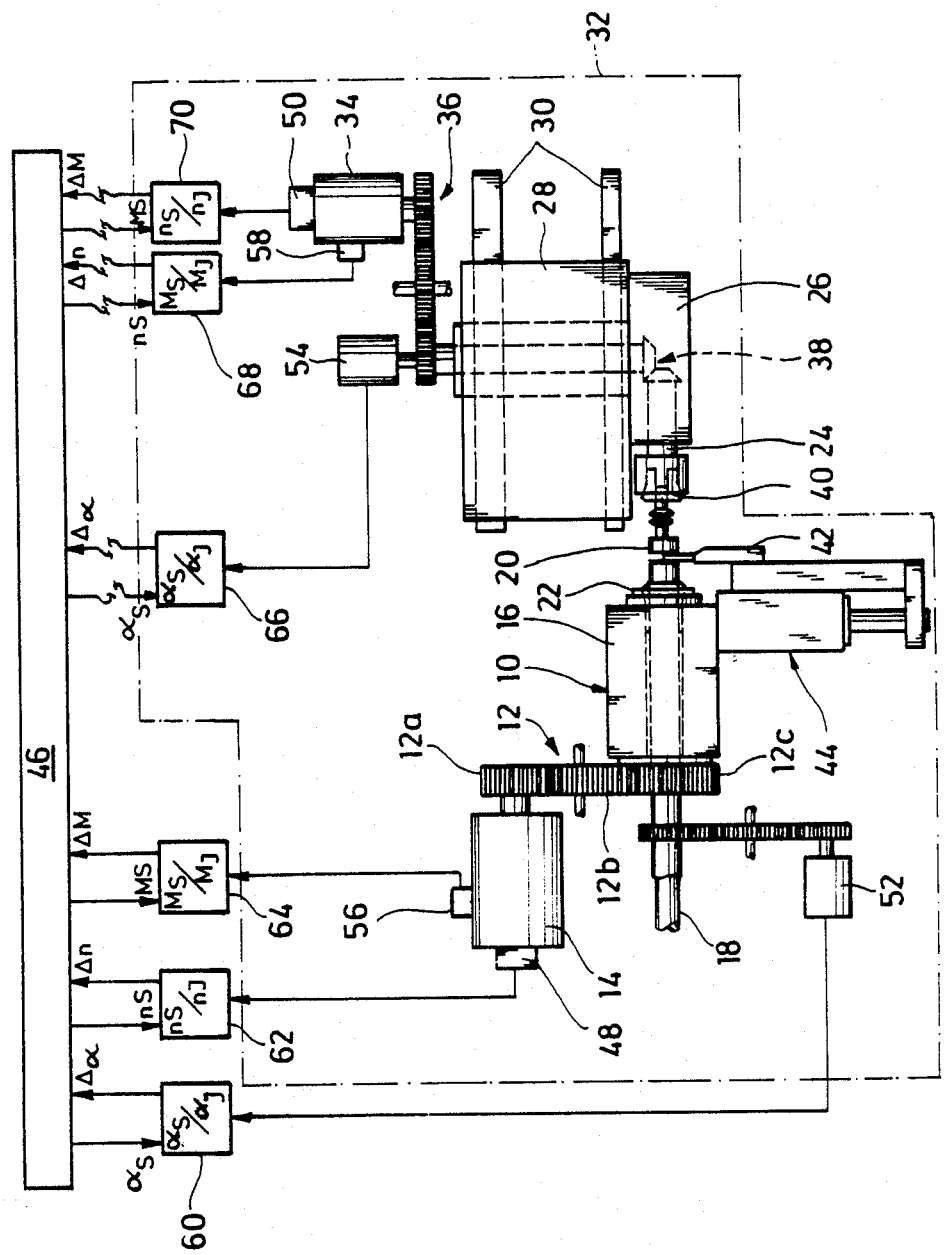

METHOD AND APPARATUS FOR CHECKING PERFORMANCE OF A CUTTING-OFF OPERATION

The invention relates to a method for checking the cutting-off operation performed on a portion of material fixed in a main spindle on one side of the cutting-off point and in an auxiliary spindle on the opposite side of the cutting-off point, by a cutting-off apparatus, in particular, on an automatic lathe for working bar or rod material comprising a control unit for controlling at least one spindle drive in accordance with a given program, and also to testing apparatus for performance of this method.

It is known to use swivel-type sensors or other mechanical or optical monitoring devices to check the cutting-off operation performed by cutting-off apparatus, in particular, on automatic lathes for working bar or rod material, where the portion to be cut off is additionally fixed in an auxiliary or synchronous spindle driven in synchronism with the main spindle, in order to enable gripping of the workpiece at a defined length and to ensure a clean-cut separation of the finished workpiece. The aim of this checking procedure is to eliminate malfunctions and collisions with subsequent operations as a result of incorrect performance of the cutting-off operation.

A disadvantage of the known sensors which are swivelled into the gap or open area created by the cutting-off operation and of other mechanical and optical monitoring devices in present-day use is that they involve a great deal of technical expenditure and yet are partly usable to a limited extent only in the rugged environment of the operating area of a lathe or the like due to the risk of damage or failure.

Starting from this state of the art, the object underlying the invention is to provide an improved method and an improved apparatus for checking the cutting-off operation performed by cutting-off apparatus and automatic lathes, respectively, which require minimal additional technical expenditure, which are insensitive to the rugged operating conditions in the cutting-off area and which enable reliable generation of error signals in the event of failures in the cutting-off operation.

As far as the method is concerned, this object is attained, in accordance with the invention, by initiating operating conditions, at the end of a prescribed time interval for the cutting-off operation, which result in rotation of the spindles relative to one another in the event that the material has been completely severed at the cutting-off point, and by triggering an error signal indicating the presence of a material link or bridge at the cutting-off point in the event of a discrepancy between the specified and actual relative rotation.

Testing apparatus which is characterized in that a sensor means is provided for determining one of the following measureable quantities:

speed, shaft angle, torque for at least one of the spindles, in that in accordance with the program for the control unit, provision is made for modification of the reference value for the measured quantity which becomes effective at the end of the prescribed time interval for the cutting-off operation during which the spindles operate synchronously, in that there is associated with each sensor means a comparator for comparison of the actual value of the measured quantity with the modified reference value provided by the control unit for this measured quantity, and in that error signal generating means are provided to generate an error signal when a predetermined minimum difference between reference value and actual value of the measured quantity is exceeded, has proven expedient for performance of the inventive method.

An important advantage of the inventive testing method and the testing apparatus for its performance is that, differently from the conventional testing methods, the mechanical coupling between the two spindles due to the presence of a material link at the cutting-off point, is evaluated, to enable generation of error signals, at a point in time at which such a connection should no longer exist if the cutting-off operation had been properly performed. This novel operating principle enables evaluation of electric signals corresponding to measured values obtained with a high degree of precision and, in most cases, using control and regulating devices which are present anyway.

The advantageous configurations of the inventive method set forth in the subclaims offer various possibilities for very precise adaptation of the sensitivity of the error detection and the technical expenditure involved to the respective requirements, as will become apparent from the following description of a preferred embodiment.

An automatic lathe for working bar or rod material, comprising drive means and inventive control means is shown diagrammatically in the single accompanying FIGURE.

The illustrated automatic lathe comprises a main spindle 10 which is rotationally driven by a main drive motor 14 by means of a gearing 12 which, in the illustrated embodiment, includes three meshing gears 12a, 12b and 12c. The main spindle 10 is comprised, in the conventional manner, of a hollow spindle which is rotatably mounted in a main spindle housing 16. The material to be machined is fed to main spindle 10 in the form of a bar or rod 18 which is advanced from the rear—in the FIGURE from the left—stepwise through the hollow main spindle 10. The length of each step corresponds to the length of a workpiece 20 which is cutoff from bar 18 after completion of the machining operation. The main spindle 10 comprises at its front end—at the right in the FIGURE—in the conventional manner, a chuck 22 to clamp the bar-type material therein.

Arranged coaxially with main spindle 10 is an auxiliary spindle 24 which is oppositely spaced from main spindle 10. The auxiliary spindle 24 is rotatably mounted in an auxiliary spindle housing 26 mounted on a slide 28 which is displaceable along rails 30 parallel to the axes of the two spindles 10, 24. The rails 30 are fixedly connected to a machine base, i.e., a machine frame 32, as are the main spindle housing 16 and the main drive motor 14. The machine frame is indicated only schematically in the FIGURE. The auxiliary spindle is driven by an auxiliary spindle motor 34 by means of a reduction gear 36 and an angular gearing 38 which, in the illustrated embodiment, comprises two bevel gears. Also associated with auxiliary spindle 24 is a fixture 40 by means of which the free end of bar 18—the right end in the FIGURE—i.e., the workpiece 20 produced therefrom is fixed relative to auxiliary spindle 24.

The automatic lathe shown in the FIGURE further comprises a cutoff tool 42 which is radially displaceable in relation to the common axis of rotation of spindles 10, 24 by means of a pneumatic or hydraulic cylinder unit 44 to cutoff the bar material, i.e., sever a finished workpiece 20 from bar 18. The cylinder of cylinder unit 44 is secured to machine frame 32. A workpiece is produced by machining the bar material by turning, milling, grinding, etc. in a manner known in the art, using sets of tools which, for reasons of clarity, are not specifically shown in the FIGURE.

In a work cycle of an automatic lathe of the kind described hereinabove, fixtures 22, 40 are opened and bar 18 is advanced rightwardly until its free end can be gripped at a defined length by fixture 40 of auxiliary spindle 24. The bar is then firmly clamped by the two fixtures 22, 40 so as to subsequently rotate jointly with spindles 10, 24 which are synchronously driven to machine the bar material, i.e., to produce workpiece 20. When the machining of workpiece 20 has been completed, it is cut off from the remaining bar material by actuation of cutoff tool 42 by means of cylinder unit 44 and is then transported by means of slide 28 to a discharge location where fixture 40 is opened to release the finished workpiece. Slide 28 is subsequently returned to the initial position and bar 18 is again advanced rightwardly for production of the next workpiece in the above-described manner.

If cutoff tool 42 breaks or is worn down, or cylinder unit 44 is not operating with the specified stroke due to a failure, workpiece 20 is not completely severed from the remaining part of bar 18, with the result that the above-described work cycle cannot be carried out after completion of the machining of workpiece 20. To eliminate damage to tools, workpieces and/or machine parts and to avoid exposure of operating personnel to danger, a check is carried out, in accordance with the invention, on the cutting-off operation. The automatic lathe illustrated in the FIGURE comprises various sensor and control means for this purpose. These are described in greater detail hereinbelow.

The illustrated automatic lathe comprises a central control unit 46 which controls in a conventional manner, not illustrated in further detail, spindle motors 14, 34, cylinder unit 44 and the drive means (not illustrated) for slide 28, for feeding bar 18, for actuating fixtures 22, 40, for the tools for machining workpiece 20, etc. This control is carried out in accordance with a given program, in particular, using a microprocessor, and the data required by it on rotational speeds, feed paths and memory devices allocated to the like are stored, for example, in a semi-conductor read-only memory.

Associated with each of the spindle motors 14, 34 of the system under consideration is a speed sensor 48 and 50, respectively, for example, a tachogenerator which generates an output signal corresponding to the speed of the associated motor. Associated with each of the spindles 10, 24 is a shaft angle encoder 52 and 54, respectively. The two shaft angle encoders 52, 54 each produce an output signal corresponding to the shaft angle, i.e., the angular position of the associated spindle 10 and 24, respectively (relative to a reference or initial position). The shaft angle encoders 52, 54 may be comprised, in the conventional manner, of encoder disks and electrooptical scanners.

Measuring devices 56, 58 for measurement of the motor current are provided for further sensing and feedback purposes and produce an output signal corresponding to the motor current of the associated spindle motor 14 and 34, respectively. These motors are normally speed-adjustable dc motors whose field is created by permanent magnets and whose armature current is proportional to the torque generated by the respective motor. In the simplest form, the measuring devices 56, 58 for measurement of the motor current comprise a measuring resistor through which the motor current, i.e., the armature current or a current derived therefrom passes and across which there is a voltage drop which is proportional to the motor current and to the torque of the pertinent motor, respectively.

Both the main spindle drive and the auxiliary spindle drive of the system under consideration each have three associated comparators 60, 62, 64 and 66, 68, 70, respectively, which are fed the reference values for the shaft angle, the speed and the torque, i.e., the values $\alpha_S$, $n_S$ and $M_S$ by control unit 46 and which are fed the actual values of these measured quantities, i.e., values $\alpha_I$, $n_I$, and $M_I$ by sensors 48, 50; 52, 54; and 56, 58. The differences determined by comparators 60, 62, 64 and 66, 68, 70 between the reference values and the actual values, namely values $\Delta\alpha$, $\Delta n$ and $\Delta M$, are fed back to control unit 46 in the form of electric signals.

The above-described configuration of the inventive system including the various sensors, measuring devices and comparators offers a number of possibilities for checking proper performance of a cutting-off operation before initiating further steps in a continuous work cycle. All of the checking possibilities are based on determining whether the main spindle 10 can be freely rotated relative to the auxiliary spindle 24 (or viceversa), which means that the cutting-off operation has been carried out to completion, or whether the spindles are still coupled, which means that a material link between the finished workpiece 20 and the remaining part of bar 18 has been left over from the cutting-off operation due to a system failure.

In the simplest form of checking whether a cutting-off operation has been properly performed, it is sufficient for the drive of auxiliary spindle 24, i.e., auxiliary spindle motor 34 to be switched off at the end of a time interval prescribed for the cutting-off operation by central control unit 46, while main drive motor 14 is simultaneously first allowed to continue running. Under these conditions, there will be no deviation from the reference values for the position, i.e., the shaft angle, the speed and the torque of main drive motor 14 if the cutting-off operation has been carried out successfully. In this case, an error signal to modify the current program for central control unit 46 is not triggered. If, however, a material link has been left over from the attempt to sever the finished workpiece 20 from the rest of bar 18, the effect of the braking of main drive motor 14 and gearing 12 on auxiliary spindle 24 will, in accordance with the invention, result in deviations from the reference values for the shaft angle, the speed and the torque, which are reported back to central control unit 46 and are interpreted there as error signals which, for example, interrupt automatic operation and call an operator's attention to a system failure. It will be clear to one skilled in the art that, to trigger an error signal, the discrepancies between the respective actual values and reference values must lie outside of the usual control range which is predetermined for the quantities to be controlled, in the conventional manner, in a system of the kind under consideration. It will also be apparent that, in principle, deviation of one of the controlled variables is sufficient to signalize an error. In practice, this means that a reference value/actual value comparison need only be made for one of the monitored quantities, i.e., for the shaft angle, the speed or the torque, as the presence of a material link independently affects each of the three aforementioned quantities. Ultimately, a single sensor or a single measuring device for one of the two spindles is sufficient to generate an error signal in the event that a mechanical connection between workpiece 20 and bar 18 has withstood the cutting-off operation.

If, however, both main spindle 10 and auxiliary spindle 24 each have three sensors with associated comparators for reference value/actual value comparisons, as in the system illustrated in the FIGURE, the complete system avails of a high degree of flexibility for controlling the operating conditions at the end of the prescribed time interval for the cutting-off operation, and, at this point in time, it is, for example, possible to make a minimal modification in the reference value for the position or the speed of one of the spindles which until then had been operating synchronously, in order to check with a very high degree of sensitivity whether a material link is still present. In this way, a system failure can be detected yet the stress on the bar material, the chucks, the spindle bearings etc. is extremely low. Therefore, even a very weak material link which would be twisted off by the speed difference resulting from simple braking of the auxiliary spindle is detectable. Undesired cutoff irregularities can thus be eliminated on workpieces demanding a high degree of manufacturing precision.

What is claimed is:

1. A method for checking the cutting-off operation performed by a cutting-off apparatus on a portion of material fixed in a main spindle on one side of the cutting-off portion and in an auxiliary spindle on the opposite side of the cutting-off portion, in particular, on an automatic lathe for working bar material, said automatic lathe including a control unit for controlling the shaft angle, speed and/or torque of at least one drive for the main or auxiliary spindles, comprising:
    signaling the spindle drive for at least one of the main or auxiliary spindles to operate at a predetermined shaft angle, speed and/or torque corresponding to complete cut-off of said portion at the end of a prescribed time interval for the cutting-off operation;
    measuring the shaft angle, speed and/or torque of the drive of said at least one of the main or auxiliary spindles after initiating signaling of the drive of said at least one of the main or auxiliary spindles; and
    indicating the presence of a material link at said cutting-off portion by sensing a discrepancy between said predetermined shaft angle, speed and/or torque and a measured shaft angle, speed and/or torque.

2. A method as defined in claim 1, further comprising the step of:
    braking or accelerating the other of said spindles while the drive for said at least one spindle is maintained.

3. A method as defined in claim 1, wherein:
    relative rotation of said spindles is attempted by signaling different predetermined values for the speed, the shaft angle and/or the driving torque for said two spindles; and
    discrepancies between said predetermined and measured values are determined by comparison of at least one of said predetermined values for and said measured values of the speed, the shaft angle and/or the torque for at least one of said spindles.

4. Testing apparatus for checking the cutting-off operation performed by a cutting-off apparatus on a portion of material fixed in a main spindle on one side of the cutting-off portion and in an auxiliary spindle on the opposite side of the cutting-off portion, in particular, on an automatic lathe for working bar material, said automatic lathe including a control unit for controlling the shaft angle, speed and/or torque of at least one of the main or auxiliary spindles comprising:
    sensor means (48, 50, 52, 54, 56, 58) for measuring at least one of the following measurable quantities:
    speed, shaft angle, torque, for at least one of said spindles;
    wherein said control unit signals to operate said spindles at a predetermined speed, shaft angle, and/or torque;
    comparator means (60, 62, 64, 66, 68, 70) responsive to the control unit and each sensor means (48, 50, 52, 54, 56, 58) for comparing the measured values for speed, shaft angle and torque for the spindles with the values therefor provided by said control unit (46) in a period of time after the prescribed time interval for the cutting-off operation; and
    error signal generating means responsive to said comparator means for generating an error signal in the event of a predetermined minimum difference between the measured values for speed, shaft andle and/or torque for the spindles and the values provided therefor by the control unit in a period of time after the prescribed time interval for the cutting-off operation.

5. Testing apparatus according to claim 4, wherein:
    a drive for one of the main or auxiliary spindles is signaled at the end of the prescribed time interval for the cutting-off operation to brake or accelerate said one spindle while a drive for the other spindle is maintained.

6. Testing apparatus according to claim 4, wherein:
    the operating conditions of said at least one of the main or auxiliary spindles is initiated at the end of the prescribed time interval for the cutting-off operation by signaling different predetermined operating conditions for the speed, the shaft angle and/or the driving torque for said two spindles; and
    discrepancies between said predetermined and said measured operating conditions of said spindles are determined by comparison of at least one of the predetermined and measured operating conditions for at least one of said spindles.

7. In an automatic lathe having a main spindle which is rotationally driven by a main drive motor, an auxiliary spindle, and a cutting-off apparatus for cutting-off material fixed by and between the main spindle and the auxiliary spindle, a method of checking the cutting-off operation of the cutting-off apparatus comprising:
    operating the cutting-off apparatus and the main drive motor for a prescribed time interval to attempt to effect a cutting-off operation; and
    in a period of time after the prescribed time interval for the cutting-off operation, while allowing the main drive motor to continue running:
    signaling the main drive motor to rotate at a prescribed shaft angle, speed and/or torque;
    measuring the shaft angle, speed and/or torque of the main drive motor after said signaling; and
    checking the cutting-off operation of the cutting-off apparatus based on a deviation, if any, between the prescribed shaft angle, speed and/or torque for the main drive motor and the measured shaft angle, speed and/or torque for the main drive motor;

wherein a deviation between the prescribed shaft angle, speed and/or torque for the main drive motor and the measured shaft angle, speed and/or torque for the main drive motor is indicative of an unsuccessful cutting-off operation and no deviation between the prescribed shaft angle, speed and/or torque for the main drive motor and the measured shaft angle, speed and/or torque for the main drive motor is indicative of a successful cutting-off operation.

8. A method according to claim 7, further comprising:

driving the auxiliary spindle with an auxiliary spindle motor during the prescribed time interval of the cutting-off operation; and switching off the auxiliary spindle motor at the end of the prescribed time interval for the cutting-off operation.

9. In an automatic lathe having a main spindle which is rotationally driven by a main drive motor, an auxiliary spindle which is driven by an auxiliary spindle motor, and a cutting-off apparatus for cutting-off material fixed by and between the main spindle and the auxiliary spindle, a method of checking the cutting-off operation of the cutting-off apparatus comprising:

operating the main drive motor and the auxiliary spindle motor synchronously for a prescribed time interval during a cutting-off operation; and in a period of time after the prescribed time interval for the cutting-off operation, while allowing at least one of the main drive or the auxiliary spindle motors to continue running:

signaling said at least one motor to rotate at a prescribed shaft angle, speed and/or torque;

measuring the shaft angle, speed and/or torque of said at least one motor after said signaling; and checking the cutting-off operating of the cutting-off apparatus based on a deviation, if any, between the prescribed shaft angle, speed and/or torque for said at least one motor and the measured shaft angle, speed and/or torque for said at least one motor;

wherein a deviation between the prescribed shaft angle, speed and/or torque for said at least one motor and the measured shaft angle, speed and/or torque for said at least one motor indicates whether said cutting-off operation is complete.

* * * * *